United States Patent [19]

Håkanson

[11] Patent Number: 4,463,337

[45] Date of Patent: Jul. 31, 1984

[54] TEMPERATURE MEASURING SENSORS AND METHODS FOR ADJUSTING SAME

[75] Inventor: Bo H. Håkanson, Lund, Sweden

[73] Assignee: Crafon Medical AB, Sweden

[21] Appl. No.: 367,931

[22] Filed: Apr. 13, 1982

[30] Foreign Application Priority Data

Apr. 15, 1981 [SE] Sweden ............................. 8102429

[51] Int. Cl.³ ........................................... H01C 10/00
[52] U.S. Cl. .................................. 338/22 R; 338/195; 338/25; 338/307; 338/308; 338/309; 29/612; 29/620
[58] Field of Search ............ 338/22 R, 22 SD, 23–25, 338/195, 306–309; 29/612, 620; 427/101, 102, 293

[56] References Cited

U.S. PATENT DOCUMENTS 3,555,671 1/1971 Aizicovici ............................ 29/620
4,041,440 8/1977 Davis et al. ...................... 338/22 R
4,184,062 1/1980 Schmidt .............................. 29/593
4,332,081 6/1982 Francis ................................ 29/612

FOREIGN PATENT DOCUMENTS 1470630 4/1977 United Kingdom ................. 29/620

Primary Examiner—Roy N. Envall, Jr.
Assistant Examiner—Christopher N. Sears
Attorney, Agent, or Firm—Lerner, David, Littenberg, Krumholz & Mentlik

[57] ABSTRACT

Methods for adjusting the resistance of temperature measuring sensors are disclosed, including measuring the resistance for a first heat-sensitive portion of the sensor at a first predetermined temperature, measuring the resistance for a second heat-sensitive portion of the temperature measuring sensor at a second predetermined temperature, determining the overall resistance for the temperature measuring sensor from these measured values, and adjusting the resistance of the second heat-sensitive portion so that the overall resistance for the temperature measuring sensor substantially corresponds to the predetermined resistance value. Temperature measuring sensors are also disclosed, including an electrically non-conductive base, first and second heat-sensitive materials applied to first and second portions of the electrically non-conductive base, the second heat-sensitive material being substantially less sensitive to variations in temperature than the first heat-sensitive material, and an electrical contact portion applied to the electrically non-conductive base, so that the first and second heat-sensitive portions are in substantial juxtaposition with each other, with the electrical contact portion therebetween.

4 Claims, 1 Drawing Figure

U.S. Patent Jul. 31, 1984 4,463,337
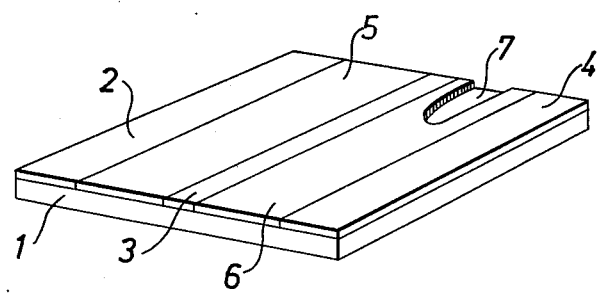

TEMPERATURE MEASURING SENSORS AND METHODS FOR ADJUSTING SAME

FIELD OF THE INVENTION

The present invention relates to temperature measuring sensors, and to methods for adjusting the resistance for temperature measuring sensors. More particularly, the present invention relates to such temperature measuring sensors having electrical properties, such as resistance, which vary with temperature, and which include a heat-sensitive portion for which the electrical property, such as resistance, can be measured. Still more particularly, the present invention relates to the use of such temperature measuring sensors in connection with devices for the measurement of temperature in the medical field.

BACKGROUND OF THE INVENTION

Various temperature measuring sensors intended for use in the medical and other fields are known. Efforts have been made to manufacture such sensors, as well as the instruments on which they are utilized, as cheaply and simply as possible, primarily in order to make these devices disposable after use. It is thus intended that such devices be made which can be thrown away, and which need not be reused.

On the other hand, it nevertheless remains essential, particularly since these devices are intended for use in the medical field, that these devices be capable of use with a degree of accuracy such that reliance can be placed on the values read from them. This is of particular importance during medical examinations, for example. Besides use in the medical field, however, those having knowledge of this business will also understand that such a device can be used in other fields, such as in connection with purely industrial applications where a simple and cheap, but nevertheless reliable temperature reading is required.

Several different designs of thermometers including such temperature measuring sensors, and in which the temperature sensors of the present invention could be incorporated, are set forth in the prior art. These include U.S. Pat. Nos. 4,317,367; 4,296,663; and 4,253,334; and U.S. Pat. No. 4,382,246. Furthermore, U.S. Pat. Nos. 4,200,970 and 4,236,298 disclose processes for adjusting thermistors which are to be fitted as temperature sensors in other thermometer designs therefor. However, these and other known processes for adjusting thermistors and the like suffer from the disadvantage that heat is developed in any mechanical processing utilized in order to adjust the electrical property, such as resistance, of the temperature sensitive portions of these sensors. Thus, it becomes quite difficult to measure these properties as a control at a precisely predetermined temperature.

Furthermore, U.S. Pat. No. 4,041,440 discloses thermistor-resistor networks produced from thick films, and methods of adjusting the overall resistances of same. Thus, in FIGS. 1 through 4 thereof this patent includes various configurations of separated thermistor and resistor thick film portions, interconnected by conductive portions, and specified means for adjusting specific sections of these conductive portions so as to alter the resistance of the thermistor component, as well as means for altering the resistance of the resistive component thereof.

However, none of this art has disclosed methods for adjusting the resistance of such sensors which can be carried out in a simple and accurate manner so as to produce a disposable thermometer including these temperature sensing elements therein.

BRIEF SUMMARY OF THE INVENTION

In accordance with the present invention, these and other objects have now been accomplished. Thus, in accordance with the method of the present invention the resistance of a temperature measuring sensor whose resistance varies with temperature can now be adjusted in order to produce a temperature measuring sensor having a predetermined resistance value. The method which has now been discovered includes measuring the resistance for a first heat-sensitive portion of the sensor, and of a second heat-sensitive portion of the sensor, in which the second heat-sensitive portion of the sensor is substantially less sensitive to variations in temperature than is the first heat-sensitive portion thereof, measurement of the resistance of the first heat-sensitive portion being made at a first predetermined temperature, measuring the resistance for the second heat-sensitive portion at a second predetermined temperature, determining the overall resistance for the temperature measuring sensor from the measured values of the first and second heat-sensitive portions, and adjusting the resistance for the second heat-sensitive portion so that the overall resistance for the temperature measuring sensor substantially corresponds to the predetermined resistance value. In accordance with a preferred embodiment of this method, the resistance for the second heat-sensitive portion is measured during the adjusting of that resistance. Preferably, the first and second predetermined temperatures are the same temperature.

In accordance with a preferred embodiment of the method of the present invention, the first heat-sensitive portion is a thermistor material. Preferably, the temperature measuring sensor includes a pair of first electrical contact portions surrounding the first heat-sensitive portion, whereby measuring of the resistance for the first heat-sensitive portion can be made across that pair of first electrical contact portions.

In accordance with another embodiment of the method of the present invention, the second heat-sensitive portion of the sensor is a resistance material, and the sensor preferably includes a pair of second electrical contact portions surrounding the second heat-sensitive portion, whereby measurement of the resistance for the second heat-sensitive portion can be made across the pair of second electrical contact portions. Preferably, one of the pair of first electrical contact portions is the same electrical contact portion as one of the pair of second electrical contact portions.

In accordance with another embodiment of the method of the present invention, the temperature measuring sensor includes an electrically non-conductive material, and the first and second heat-sensitive portions are applied as thick films onto the electrically non-conductive material.

In accordance with the present invention, temperature measuring sensors are also provided, including an electrically non-conductive base member, a first heat-sensitive material applied to a first portion of the electrically non-conductive base member, a second heat-sensitive material applied to a second portion of the electrically non-conductive base member, wherein the second heat-sensitive material is substantially less sensitive to variations in temperature than is the first heat-sensitive material, and an electrical contact portion applied to the electrically non-conductive base member, the first and second heat-sensitive materials are in substantial juxtaposition with each other, with the electrical contact portion therebetween, so that the resistance for each of the first and second heat-sensitive materials can be separately measured at predetermined temperatures, the overall resistance for the temperature measuring sensor can be calculated therefrom, and the resistance for the second heat-sensitive material can be adjusted so that the overall resistance of the temperature measuring sensor can be made to substantially correspond to the predetermined resistance value.

In accordance with a preferred embodiment of the temperature measuring sensor of the present invention, the electrical contact portion includes a plurality of electrical contact portions, including a first electrical contact portion comprising the electrical contact portion between the first and second heat-sensitive materials, a second electrical contact portion on a side of the first heat-sensitive material opposite that of the first electrical contact portion, and a third electrical contact portion on an opposite side of the second heat-sensitive material from that of the first electrical contact portion, whereby the resistances of the first and second heat-sensitive materials can be separately measured across the first and second electrical contact portions, and the first and third electrical contact portions, respectively.

In accordance with a preferred embodiment of the temperature measuring sensor of the present invention, the first heat-sensitive portion is a thermistor material, and the second heat-sensitive portion is a resistance material. Preferably, both the first and second heat-sensitive portions are thick films applied to the electrically non-conductive base member.

One of the critical elements of both the method and the sensor of the present invention is that the second heat-sensitive portion, for which the property such as resistance is measurable, is less heat-sensitive, and as a result can be adjusted and measured virtually independent of any heating which occurs during that adjustment.

BRIEF DESCRIPTION OF THE DRAWING

The drawing is a front, perspective, elevational view of a sensor made according to the present invention.

DETAILED DESCRIPTION

As indicated above, the first heat-sensitive material is preferably a thermistor material located between a pair of electrical contact members. As an example of such a material, reference can be made to such materials sold by Electro Materials Corporation of America under the designation "5000-1 TM Thermistor Inks," which have the following known properties:

| Resistance | Name | TCR, ppm °C. |
| --- | --- | --- |
| 300 Ω | 5032-1 TM | −7000 ± 500 |
| 1K | 5013-1 TM | −8500 ± 500 |
| 10K | 5014-1 TM | −9500 ± 500 |
| 100K | 5015-1 TM | −9500 ± 500 |
| 1 Meg. | 5016-1 TM | −9500 ± 500 |

As an example of a material which can be used as the second heat-sensitive material, i.e., which is far less heat-sensitive, are resistance materials having such lower sensitivity to heat, and which are also located between a pair of contact members. Again, as indicated above, one of these contact members can be the same contact member as one of the contact members surrounding the first heat-sensitive material. In any event, as an example of such resistance materials, reference is made to similar materials sold by Electro Materials Corporation of America, in this case under the name "5000 Series Resistor Inks," which are known to have the following properties:

| Property | Name | | | | |
| --- | --- | --- | --- | --- | --- |
| | 5000 | 5500 | 5000-1 | 5100-1 | 5500-1 |
| Burning temp: C. | 800 | 800 | 850 | 850 | 850 |
| TCR ppm/°C. | ±200 | ±50 | ±200 | ±100 | ±50 |
| Range or resistance Ω/sq. | 10–10 Meg | 100–100K | 10–10 Meg | 10–1 Meg | 100–100 Meg |
| Resistance tolerance in % | ±20 | ±10 | ±20 | ±15 | ±0 |

The temperature measuring sensors of the present invention can be produced by means of known thick film techniques on an electrically non-conductive material, such as an aluminum or aluminum oxide substrate, for example that sold under the name AT-3995 by Narumi China Corporation of Japan.

In a preferred method for adjusting the resistance of the temperature measuring sensors hereof, the partial resistance of the device is measured by measuring the resistance for the first heat-sensitive portion, or thermistor portion, at a fixed temperature, for example 38° C. The partial resistance represented by the resistance for the second heat-sensitive portion, or resistive material, which is less heat-sensitive than the thermistor material, is then carried out at a discretionary temperature. It is also appropriate, however, that this temperature also be chosen at about 38° C. Subsequent to these determinations, the second heat-sensitive portion, or resistive material, is then adjusted, such as by removal of the material to an extent dependent on the two measurements set forth above. In view of the fact that this second heat-sensitive portion, or resistive material, is less heat-sensitive than the first heat-sensitive portion, or thermistor material, the resistance for this part is measured during the final adjustment step itself, which can thus be interrupted when the desired overall value has been reached.

Turning to the drawing, an example of a temperature sensing device in accordance with the present invention is shown therein. The sensor consists of a base 1 of an electrically non-conducting material, such as an aluminum substrate of the type described above. On this base, contacts 2, 3, and 4 are produced by means of the aforementioned thick film technique. In the same manner, a thermistor portion 5 and a resistance portion 6 are also produced. The thermistor portion is made with the aid of the thick film technique using a thermistor material such as the type described above, and the resistance portion is made with the use of a resistance material such as those also described above. By means of the adjustment discussed above, a portion of the resistance material 6, as designated by numeral 7, is removed therefrom. This adjustment can be made, for example, by means of lasers, heat, or some other convenient type of mechanical processing.

Design of the sensors themselves can be carried out, for example, in the manner described hereinbelow.

Thus, for example, if one requires a total resistance of 4000 Ω at 38° C., for the thermistor portion a resistance of about 3900 Ω can be chosen, and for the resistance portion a resistance of about 50 Ω. The resistance is then actually read for the thermistor portion 5 at 38° C. If, for example, one then finds the actual value to be 3925 Ω, the resistance portion 6 can then be adjusted to a value of precisely 75 Ω. This can be done in such a way that the measuring electrodes are held in contact with contacts 3 and 4 during the entire adjustment of the resistance portion 6, which can then be interrupted when the required value has been obtained. Since this resistance portion 6 is less heat-sensitive than the thermistor portion 5, and can be given an original resistance value which is considerably lower than that for the thermistor portion 5, the overall final resultant value will not be noticeably affected by the heat received during adjustment. This can also be easily controlled by a final control measurement after cooling to 38° C.

It will be understood that the embodiment described herein is exemplary, and that a person skilled in the art may make many variations and modifications without departing from the spirit and scope of the invention. All such modifications and variations are intended to be included within the scope of the invention as defined in the appended claims.

In addition, comparison should be made to corresponding U.S. patent application Ser. No. 367,932 filed on the same day as this application, and entitled "Thermistors, Their Method of Production, and Thermometers Containing Same," which sets forth an alternative to the present invention having a number of points of similarity.

What is claimed is:

1. A temperature measuring sensor whose resistance varies with temperature and having a predetermined resistance value comprising an electrically non-conductive base member, a first heat-sensitive material applied to a first portion of said electrically non-conductive base member, a second heat-sensitive material applied to a second portion of said electrically non-conductive base member, said second heat-sensitive material being substantially less sensitive to variations in temperature than said first heat-sensitive material, and an electrical contact portion applied to said electrically non-conductive base member, said first and second heat-sensitive materials being in substantial juxtaposition with each other, said electrical contact portion including a longitudinally extending first electrical contact portion between said first and second heat-sensitive materials, said longitudinally extending first electrical contact portion including first and second longitudinal sides, said first longitudinal side being in direct contact with said first heat-sensitive material and said second longitudinal side being in direct contact with said second heat-sensitive material, a second electrical contact portion in direct contact with a side of said first heat-sensitive material opposite that of said first electrical contact portion, and a third electrical contact portion in direct contact with an opposite side of said second heat-sensitive material from that of said first electrical contact portion, whereby said resistances of said first and second heat-sensitive materials can be separately measured across said first and second electrical contact portions, and said first and third electrical contact portions, respectively, at predetermined temperatures, the overall resistance for said temperature measuring sensor can be calculated therefrom, and the overall resistance of said temperature measuring sensor can be made to substantially correspond to said predetermined resistance value by adjusting only the resistance for said second heat-sensitive material.

2. The temperature measuring sensor of claim 1 wherein said first heat-sensitive material comprises a thermistor material.

3. The temperature measuring sensor of claim 2 wherein said second heat-sensitive material comprises a resistance material.

4. The temperature measuring sensor of claim 3 wherein both said first and second heat-sensitive materials comprise thick films applied to said electrically non-conductive base member.

* * * * *

UNITED STATES PATENT AND TRADEMARK OFFICE
CERTIFICATE OF CORRECTION

PATENT NO. : 4,463,337
DATED : July 31, 1984
INVENTOR(S) : Hakanson

It is certified that error appears in the above-identified patent and that said Letters Patent are hereby corrected as shown below:

On the title page, the Assignee should read --Gambro Crafon AB, Sweden--

*Signed and Sealed this*

*Second Day of April 1985*

[SEAL]

*Attest:*

DONALD J. QUIGG

*Attesting Officer*   *Acting Commissioner of Patents and Trademarks*